United States Patent
Reese et al.

(10) Patent No.: US 10,738,155 B2
(45) Date of Patent: *Aug. 11, 2020

(54) PRODUCT-TO-PRODUCT PROCESS FOR PREPARATION OF LOW VISCOSITY POLYOXYALKYLENE POLYOLS

(71) Applicants: Covestro LLC, Pittsburgh, PA (US); Covestro Deutschland AG, Leverkusen (DE)

(72) Inventors: Jack R. Reese, Coraopolis, PA (US); Edward P. Browne, Cologne (DE); Yue Yang, Canton, MI (US); Jose F. Pazos, Charleston, WV (US)

(73) Assignees: Covestro LLC, Pittsburgh, PA (US); Covestro Deutschland AG, Leverkusen (DE)

(*) Notice: Subject to any disclaimer, the term of this patent is extended or adjusted under 35 U.S.C. 154(b) by 0 days.

This patent is subject to a terminal disclaimer.

(21) Appl. No.: 16/582,149

(22) Filed: Sep. 25, 2019

(65) Prior Publication Data
US 2020/0199292 A1 Jun. 25, 2020

Related U.S. Application Data

(60) Provisional application No. 62/781,844, filed on Dec. 19, 2018.

(51) Int. Cl.
*C08G 65/12* (2006.01)

(52) U.S. Cl.
CPC .................... *C08G 65/12* (2013.01)

(58) Field of Classification Search
CPC .. C09D 171/00; C09D 171/02; C09D 171/08; C08G 65/2663; C08G 65/1202; C08G 65/2603; C08G 65/2606; C08G 65/2618; C08G 65/2636; C08G 65/2639
See application file for complete search history.

(56) References Cited

U.S. PATENT DOCUMENTS

| | | |
|---|---|---|
| 3,427,334 A | 2/1969 | Belner |
| 3,941,849 A | 3/1976 | Herold |
| 4,477,589 A | 10/1984 | van der Hulst et al. |
| 5,158,922 A | 10/1992 | Hinney et al. |
| 5,470,813 A | 11/1995 | Le-Khac |
| 5,482,908 A | 1/1996 | Le-Khac |
| 5,689,012 A | 11/1997 | Pazos et al. |
| 5,919,988 A | 7/1999 | Pazos et al. |

(Continued)

OTHER PUBLICATIONS

M. Ionescu, "Chemistry and Technology of Polyols for Polyurethanes", 2nd Edition, vol. 1, 2016, pp. 189-190.

*Primary Examiner* — Shane Fang
(74) *Attorney, Agent, or Firm* — N. Denise Brown (57) ABSTRACT

This invention relates to process for preparing low viscosity polyoxyalkylene polyols (P) that have a narrow molecular weight distribution. This process comprises reacting a H-functional starter substance ($S_i$), a H-functional starter substance ($S_x$) and a H-functional starter substance ($S_c$) with one or more alkylene oxides in the presence of a double metal cyanide catalyst. The resultant polyoxyalkylene polyols (P) have a functionality of 2 to 8 and a hydroxyl number of greater than 35 to 115 mg KOH/g polyol.

25 Claims, 3 Drawing Sheets

(56) References Cited

U.S. PATENT DOCUMENTS

| | | | |
|---|---|---|---|
| 6,077,978 | A | 6/2000 | McDaniel et al. |
| 7,919,575 | B2 | 4/2011 | Browne |
| 2011/0230581 | A1 | 9/2011 | Klescewski et al. |
| 2017/0137569 | A1 | 5/2017 | Hofmann et al. |

PRODUCT-TO-PRODUCT PROCESS FOR PREPARATION OF LOW VISCOSITY POLYOXYALKYLENE POLYOLS

FIELD OF THE INVENTION

This invention relates to an improved process for preparing low viscosity polyoxyalkylene polyols (P). These polyoxyalkylene polyols (P) have a functionality of 2 to 8 and a hydroxyl (OH) number of greater than 35 mg KOH/g to 115 mg KOH/g. This invention also relates to an improved semi-batch process that eliminates the need to use a polyether polyol of lower molecular weight to produce a polyether polyol of higher molecular weight by using a starter charge of the targeted polyether polyol product and a low equivalent weight starter substance as the initial polyether polyol starter mixture.

BACKGROUND

A challenge with the commercial production of DMC catalyzed polyols is the inability to directly use low equivalent weight starter substances such as propylene glycol, dipropylene glycol and glycerin as the main component of the starter mixture. These low equivalent weight starter substances inhibit the catalytic activity of the DMC catalyst when present as the main component of the starter mixture for the production of a semi-batch DMC catalyzed polyether polyol. Starting a reaction with such low equivalent weight starter substances also requires special commercial equipment as the amount of starter required to make higher equivalent weight products is small. For example, when making a 350 equivalent weight propylene glycol started polyether polyol, 11.0 weight percent propylene glycol is required as the low equivalent weight starter. However, when making a 1000 equivalent weight propylene glycol started polyether polyol, only 3.8 weight percent propylene glycol is required as the low equivalent weight starter. Therefore, the preparation of a 1000 equivalent weight propylene glycol started polyether polyol requires a large reaction build ratio. The reaction build ratio is defined as the product equivalent weight divided by the starter equivalent weight. Thus, for a propylene glycol started 350 EW polyether polyol, the reaction build ratio would be 350/38 or 9.2. By comparison, in the case of a 1000 EW polyether polyol the build ratio would be 1000/38 or 26.3. This large reaction build ratio would require special reaction equipment to handle the low amount of starter required at the start of the process. The minimum reactor charge is dictated by the mixing configuration (i.e. touching or covering lowest most agitator blade) and the heating requirements (i.e. covering sufficient surface area for jacketed or internal heating/cooling systems or filling the external recirculation loop for external heating/cooling systems). The industry has overcome this challenge of the commercial production of products having a wide range of equivalent weights by making and storing starter polyether polyols that can cover the whole range of products to be made. Typically, this may require more than one starter polyether polyols be stored. One starter polyether polyol to make low to intermediate equivalent weight products (having hydroxyl numbers of 112 to 28 mg KOH/g polyol) and another starter polyether polyol to make higher equivalent weight products (having hydroxyl numbers of <28 mg KOH/g polyol). As one skilled in the art will recognize these starter polyether polyols, referred to herein as low equivalent weight starter polyether polyols, are lower in equivalent weight than the targeted polyether polyol product but higher in equivalent weight than the initial low equivalent weight starter substance (i.e., propylene glycol, dipropylene glycol, glycerin, etc.) and are initially charged to the reactor to provide the minimum charge required for the reactor configuration. The storage of these low equivalent weight starter polyether polyols and preparation of them in the reactor systems takes away from resources to make the finished products. Therefore, there is a need to eliminate these low equivalent weight starter polyether polyols.

SUMMARY

The present invention is directed to a process for the preparation of polyoxyalkylene polyols (P) having a functionality of 2 to 8 and a hydroxyl number greater than 35 mg KOH/g polyol to 115 mg KOH/g polyol by reaction of H-functional starter substances $(S_i)$, $(S_c)$ and $(S_x)$ with one or more alkylene oxide(s) in the presence of a double metal cyanide catalyst (DMC). This process comprises (α) forming a starter mixture comprising the H-functional starter substance $(S_i)$, the H-functional starter substance $(S_x)$ and the double metal cyanide catalyst, and, optionally, stripping the starter mixture under vacuum, (γ) continuously adding (a) an alkylene oxide to the starter mixture of step (a); and (δ) continuously adding the H-functional starter substance $(S_c)$;

wherein:

(i) steps (γ) and (δ) either start simultaneously or step (γ) starts before step (δ);

(ii) the theoretical functionality of the H-functional starter substance $(S_i)$ is identical to the theoretical functionality of the polyoxyalkylene polyol (P) and the measured hydroxyl number of the H-functional starter substance $(S_i)$ is within 10% of the measured hydroxyl number of the polyoxyalkylene polyol (P);

(iii) the H-functional starter substance $(S_x)$ has an equivalent weight greater than 10 Da and of less than or equal to 250 Da;

(iv) the H-functional starter substance $(S_c)$ has an equivalent weight of greater than 10 Da and less than or equal to 70 Da;

(v) in step (δ) the continuous addition of the H-functional starter substance $(S_c)$ is stopped when from 30 weight percent to 90 weight percent of the total alkylene oxide added in step (γ) has been added;

and (vi) the hydroxyl numbers are determined by ASTM D4274-11.

The process of the invention may additionally comprise:

(β) adding an activation amount of (b) one or more alkylene oxide(s) to the starter mixture of step (α), wherein in step (γ) the continuous addition of (a) the alkylene oxide is to the mixture formed in (β); and (v) in step (δ) the continuous addition of the H-functional starter substance $(S_c)$ is stopped when from 30 to 90 weight percent of the total alkylene oxide added in steps (β) and (γ) has been added.

The present invention also relates to a process for producing DMC catalyzed polyoxyalkylene polyols with narrow (i.e. symmetrical or a distribution where the left side of the distribution mirrors the right side or the distribution is not skewed to one side or the other and has no second peaks or shoulders on one side or both sides) molecular weight distributions and low viscosities, and provides an efficient process to make such polyoxyalkylene polyols by eliminating a dedicated low equivalent weight starter polyether polyol and only using a low equivalent weight starter substance mixed with a polyoxyalkylene polyether substance that has a similar hydroxyl number, functionality and composition of the product to be produced as the starter mixture. This may be referred to as a "product to product" process in which the starter mixture comprises the same product that is being prepared and a low equivalent weight substance. In addition, the novel process is sustainable (i.e. short cycle times, low quantities of catalyst, reduced energy consumption, etc.) and it forms a high quality polyol product (i.e. a product having a narrow molecular weight distribution and a low viscosity).

It is an object of the present invention to provide a process for the preparation of polyoxyalkylene polyols that exhibit good viscosity and polydispersity, without the need to produce and have a separate storage tank for the low equivalent weight starter polyether polyol.

DETAILED DESCRIPTION OF THE INVENTION

The present invention will now be described for purposes of illustration and not limitation. Except in the operating examples, or where otherwise indicated, all numerical parameters are to be understood as being prefaced and modified in all instances by the term "about", in which the numerical parameters possess the inherent variability characteristic of the underlying measurement techniques used to determine the numerical value of the parameter. Examples of such numerical parameters include, but are not limited to, OH numbers, equivalent and/or molecular weights, functionalities, amounts, percentages, etc. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. All end points of any range are included unless specified otherwise. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are inherently described in this specification such that amending to expressly recite any such sub-ranges would comply with the requirements of 35 U.S.C. § 112 and 35 U.S.C. § 132(a).

The grammatical articles "a", "an", and "the", as used herein, are intended to include "at least one" or "one or more", unless otherwise indicated, even if "at least one" or "one or more" is used in certain instances. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Equivalent weights and molecular weights given herein in Daltons (Da) are number average equivalent weights and number average molecular weights respectively, as determined by GPC, unless indicated otherwise.

As used herein, hydroxyl number (OH number) was determined according to ASTM D4274-11, and was reported in mg [KOH]/g [polyol].

The viscosity was conducted on an Anton-Paar SVM 3000 viscometer at 25° C. that has been demonstrated to give equivalent results as can be generated with ASTM-D4878-15. The instrument was calibrated using mineral oil reference standards of known viscosity.

The number average and weight average, Mn and Mw, respectively, molecular weights were determined by gel-permeation chromatography (GPC) using a method based on DIN 55672-1, employing chloroform as the eluent with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol as the standard.

As used herein, a polyoxyalkylene polyol with a narrow molecular weight distribution means one that is symmetrical or a molecular weight distribution in which the left side of the distribution mirrors the right side of the distribution. In other words, the molecular weight distribution is not skewed to one side or the other and has no second peaks or shoulders on one side or on both sides. Symmetrical means that there are no shoulders, peaks or tailing out on either side of the main peak. As would be recognized by one skilled in the art, a perfect monomodal material has a PDI (polydispersity index) of 1.00.

In accordance with the invention, the process comprises (a) forming a starter mixture comprising a H-functional starter substance ($S_i$), a H-functional starter substance ($S_x$) and a double metal cyanide catalyst, in which the starter mixture is optionally stripped under vacuum with or without nitrogen. This starter mixture is typically formed in a reactor. The portion of double metal cyanide catalyst and H-functional starter substances ($S_i$) and ($S_x$) is effective to initiate polyoxyalkylation of the starter mixture once an alkylene oxide is introduced into the reactor.

Suitable H-functional starter substances ($S_i$) to be used in accordance with the present invention include, for example, a polyoxyalkylene polyol which has a molecular weight that is approximately equal to the molecular weight of the product, i.e. the polyoxyalkylene polyol (P) that is being formed. In accordance with the invention, the theoretical functionality of the H-functional starter substance ($S_i$) is identical to the theoretical functionality of the polyoxyalkylene polyol (P) and the measured hydroxyl number of the H-functional starter substance ($S_i$) is within 10%, and preferably is within 5%, of the measured hydroxyl number of the polyoxyalkylene polyol (P). Thus, suitable H-functional starter substances ($S_i$) may have a functionality of 2 to 8, or preferably from 2 to 6, or more preferably from 2 to 3, and an OH number of greater than 35 to about 115, or greater than 35 to about 65, or greater than 35 to about 56. In a preferred embodiment, the H-functional starter substance ($S_i$) is the same product (based on functionality, composition and hydroxyl number) as the final targeted product. This embodiment achieves the objective of eliminating the need to produce a low equivalent weight starter polyether polyol and have a separate storage tank to store this material by using the finished product from a previous production batch as the H-functional starter substance ($S_i$) of the starter mixture (hence a product-to-product approach).

When the H-functional starter substance ($S_i$) of the starter mixture comprises a polyoxyalkylene polyol, this polyoxyalkylene polyol can be a known residual amount of the product left in the reactor from a prior batch of the same product. This polyoxyalkylene polyol may be prepared from the same reactants as the final product prepared by the process of the invention, have the same functionality, molecular weight and hydroxyl number as the final product resulting from the process of the present invention, and thus be essentially the same as the final product prepared by the instantly claimed process. The skilled artisan would, however, recognize that it is not actually the same product as the final product since it was prepared in a different lot or reactor batch. As an example, after completion of the production of a batch of polyoxyalkylene polyol in a reactor by DMC catalysis, 90% of the product is removed from the reactor. The remaining 10% of the polyoxyalkylene polyol product can be left in the reactor and used as the H-functional starter substance ($S_i$) of the starter mixture of the present invention. It is also possible that the H-functional starter substance ($S_i$) of the starter mixture can comprise a final polyoxyalkylene polyol product that is stored in a finished goods storage vessel from a previous campaign which can be brought back into the reactor as the H-functional starter substance ($S_i$) of the starter mixture. The H-functional starter substance ($S_i$) of the starter mixture can also comprise a final polyoxyalkylene polyol product that has a similar molecular weight as the target product that was made using alkoxylation catalyst known in the art, examples are basic catalysts (KOH or equivalent) and acid catalysts (Lewis acid or Bronsted acid induced catalysis), and which was refined to remove or neutralize the basic or acidic catalyst. The use of a basic catalyzed and subsequently neutralized polyoxyalkylene product is necessary, for example, when using this product as the H-functional starter substance ($S_i$) for the initial or first production of the polyoxyalkylene polyol (P) product. Removal or neutralization of the basic catalyst from the final polyoxyalkylene polyol product to be used as the H-functional starter substance ($S_i$) is required, as those skilled in art will recognize, because even trace levels of base or alkalinity deactivates and/or inhibits the DMC catalyst present in the starter mixture. In all cases, when a polyoxyalkylene polyol is used as the H-functional starter substance ($S_i$), the polyoxyalkylene polyol acts as a reaction medium to provide the minimum starter charge required by the reactor configuration (e.g. cover agitator blade, fill recirculation loop, cover internal heating/cooling coils, etc.). In one embodiment, the polyoxyalkylene polyol which is used as the H-functional starter substance ($S_i$) of the starter mixture has the same molecular weight and alkylene oxide composition as the targeted final polyoxyalkylene polyol product (P). In one embodiment, the polyoxyalkylene polyol used as the H-functional starter substance ($S_i$) of the starter mixture does not substantially participate in the reaction. The minimization of the molecular weight growth of the H-functional starter substance ($S_i$) of the starter mixture which comprises a polyoxyalkylene polyol provides the opportunity to produce a final polyoxyalkylene polyol product (P) with a narrow molecular weight distribution and low viscosity. In one embodiment, this H-functional starter substance ($S_i$) of the starter mixture which comprises a polyoxyalkylene polyol contains double metal cyanide catalyst residuals. In one embodiment, the double metal cyanide catalyst residuals were previously exposed to alkylene oxide. In one embodiment, the double metal cyanide catalyst residuals of the polyoxyalkylene polyol which is used as the H-functional starter substance ($S_i$) of the starter mixture were previously exposed to alkylene oxide under reaction conditions ("pre-activated" catalyst).

The H-functional starter substance ($S_i$) comprising a polyoxyalkylene polyol can contain antioxidants and/or acids known to those skilled in the art. For example, suitable antioxidants for polyoxyalkylene polyols include sterically hindered phenolic compounds such as BHT (i.e. butylated hydroxytoluene), octadecyl 3-(3,5-di-tert-butyl-4-hydroxyphenyl) propionate (i.e. Irganox 1076), 3,4-dihydro-2,5,7,8-tetramethyl-2-(4,8,12-trimethyltridecyl)-2H-1-benzopyran-6-ol (i.e. Irganox E-201), etc. Examples of suitable acids include any inorganic protic mineral acid or organic acid which is known to be suitable as described in the art. Phosphoric acid is an example of a suitable acid.

The H-functional starter substance ($S_i$) which may comprise a polyoxyalkylene polyol can be vacuum stripped with or without steam and/or nitrogen to remove any residual compounds introduced from the reaction or the raw materials. The stripping of the H-functional starter substance ($S_i$) can occur either before or after the addition of the H-functional starter substance ($S_x$). Stripping of the H-functional starter substance ($S_i$) can also occur either before or after the addition of the double metal cyanide catalyst. Vacuum stripping of the H-functional starter substance ($S_i$) can occur with or without steam and/or nitrogen at ambient temperature, reaction temperature, or any value in between.

Suitable compounds to be used as the low equivalent weight H-functional starter substances ($S_x$) have an equivalent weight of less than or equal to 250 Da, or preferably less than or equal to 70 Da, or more preferably less than or equal to 50 Da. The suitable compounds to be used as low equivalent weight H-functional starter substances ($S_x$) may also have an equivalent weight of greater than or equal to 10 Da, preferably greater than or equal to 20 Da, and more preferably greater than or equal to 30 Da. Thus, H-functional starter substances ($S_x$) may have an equivalent weight between any combination of these upper and lower values, such as, for example, of greater than or equal to 10 Da to less than or equal to 250 Da, or preferably of greater than or equal to 20 Da to less than or equal to 70 Da, or more preferably of greater than or equal to 30 Da to less than or equal to 50 Da. Suitable compounds, for example, include compounds that have a functionality of from 2 to 8, or preferably from 2 to 3. Some examples of suitable compounds to be used as the H-functional starter substance ($S_x$) include diols and triols such as, for example, ethylene glycol, propylene glycol, butylene glycol, glycerin, water, trimethylolpropane (TMP), sorbitol, sucrose and other low equivalent weight polyoxyalkylene polyols (which have an equivalent weight within the above range). These compounds are low equivalent weight starters. In one embodiment, the low equivalent weight H-functional starter substance ($S_x$) of the starter mixture may be the same substance as the continuously fed H-functional starter substance ($S_c$).

The low equivalent weight H-functional starter substance ($S_x$) is added at a level from 0.1 weight percent to 2.0 weight percent (or from 0.25 weight percent to 1.75 weight percent, or from 0.5 weight percent to 1.5 weight percent) based on the weight of the polyoxyalkylene polyol H-functional starter substance ($S_i$) of the starter mixture. The low equivalent weight H-functional starter substance ($S_x$) can be added to the reaction vessel before, after or simultaneously with the polyoxyalkylene polyol H-functional starter substance ($S_i$) of the starter mixture described above. The low equivalent weight, H-functional starter substance ($S_x$) can be added to the reaction vessel before, after or simultaneously with the DMC catalyst. The low equivalent weight H-functional starter substance ($S_x$) can be added before or after the polyoxyalkylene polyol H-functional starter substance ($S_i$) and the DMC catalyst of the starter mixture is stripped with or without nitrogen. The low equivalent weight H-functional starter substance ($S_x$) must be added to the polyoxyalkylene polyol H-functional starter substance ($S_i$) and DMC catalyst before alkylene oxide is added to the reaction vessel. The presence of a low equivalent weight H-functional starter substance ($S_x$) in the starter mixture formed in step ($\alpha$) is referred to as a "pre-CAOS" (Continuous Addition of Starter) charge.

Acid can be added to the low equivalent weight H-functional starter substance ($S_x$) before or after the low equivalent weight H-functional starter substance ($S_x$) is added to the reaction vessel. The acid may be any inorganic protic mineral acid or organic acid which is known to be suitable as described in the art. Typically, the amount of acid to be added to the low equivalent weight H-functional starter substance ($S_x$) ranges from 30 to 250 ppm, based on the weight of the low equivalent weight H-functional starter substance ($S_x$). Phosphoric acid is an example of a suitable acid.

Suitable double metal cyanide catalysts for the present invention include any DMC catalyst known in the art. The well-known DMC catalysts are typically the reaction product of a water-soluble metal salt (e.g. zinc chloride) and a water-soluble metal cyanide salt (e.g. potassium hexacyanocobaltate). The preparation of DMC catalysts is described in various references, including, for example, U.S. Pat. Nos. 5,158,922, 4,477,589, 3,427,334, 3,941,849, 5,470,813 and 5,482,908, the disclosures of which are herein incorporated by reference. Particular DMC catalysts that are preferred in some embodiments of the present invention are zinc hexacyanocobaltates. In one embodiment, the DMC catalysts are amorphous.

The DMC catalyst includes an organic complexing agent. As taught in the preceding references, the complexing agent is needed for an active catalyst. Preferred complexing agents include water-soluble heteroatom-containing organic compounds that can complex with the DMC compound. In one embodiment, the preferred complexing agents are water-soluble aliphatic alcohols. Tert-butyl alcohol is a preferred complexing agent for some embodiments. In addition to the organic complexing agent, the DMC catalyst may also include a polyether as is described in U.S. Pat. No. 5,482,908, the disclosure of which is herein incorporated by reference.

Preferred DMC catalysts for use in accordance with one or more embodiments of the present process are the highly active DMC catalysts such as are described in U.S. Pat. Nos. 5,482,908 and 5,470,813. High activity allows for the use of very low concentrations of the catalyst to be used. More specifically, the concentrations of catalyst required is typically low enough to overcome or eliminate any need to remove the catalyst from the finished polyoxyalkylene polyol products (P) formed in the process. In particular, the concentration of catalyst is typically in the range of from 10 ppm to 300 ppm, or from 20 ppm to 200 ppm, or from 30 ppm to 100 ppm.

The DMC catalyst can be added as a dry powder directly to the starter mixture, or dispersed in an H-functional starter substance ($S_i$ or $S_x$ above) and added to the starter mixture. The DMC catalyst added to the starter mixture is the same as the DMC catalyst residual contained in the polyoxyalkylene polyol used as the H-functional starter substance ($S_i$) of the starter mixture. The DMC catalyst added to the starter mixture can be un-activated or fresh catalyst, i.e. catalyst that has not previously been exposed to alkylene oxide, catalyst that has been exposed to alkylene oxide under non-reaction conditions (i.e. low temperature <90° C.); or "pre-activated" catalyst, i.e. catalyst that was previously exposed to alkylene oxide under reaction conditions (i.e. high temperature ≥90° C.). The DMC catalyst residuals in the polyoxyalkylene polyol H-functional starter substance ($S_i$) of the starter mixture are considered "pre-activated" catalyst as this catalyst was exposed to alkylene oxides under reaction conditions during the making of the polyoxyalkylene polyol H-functional starter substance ($S_i$) of the starter mixture. The "pre-activated" catalyst in the polyoxyalkylene polyol H-functional starter substance ($S_i$) of the starter mixture is advantageous to the present invention to allow a rapid activation of the starter mixture when alkylene oxide is added and counter the known inhibitory effect of the low equivalent weight H-functional starter substance ($S_x$) that is present in the starter mixture. The combination of "pre-activated" catalyst from the polyoxyalkylene polyol H-functional starter substance ($S_i$) of the starter mixture and fresh or "pre-activated" catalyst added to the starter mixture also insures a good reaction (i.e. no rapid pressure increase or temperature fluctuations) when the continuously added H-functional starter substance ($S_c$) is added. The DMC catalyst added to the starter mixture can be the same as or different from the residual catalyst or "pre-activated" catalyst in the polyoxyalkylene polyol H-functional starter substance ($S_i$) of the starter mixture.

The DMC catalyst (which may be fresh catalyst or pre-activated catalyst) is typically added to the starter mixture. It can, however, also be split between the starter mixture and the continuously added H-functional starter substance ($S_c$). Splitting the DMC catalyst and feeding the DMC catalyst continuously with the H-functional starter substance ($S_c$) provides a lower initial catalyst concentration in the starter mixture, and a more uniform catalyst concentration during the production of the polyoxyalkylene polyol product (P).

In the process of the present invention, the DMC catalyst present in the starter mixture is activated in the presence of alkylene oxide. Activation of the DMC catalyst present in the starter mixture occurs by optionally ($\beta$) adding an activation amount of (b) an alkylene oxide to the starter mixture formed in step ($\alpha$). The alkylene oxide for the activation of the starter mixture can be added all at once to the starter ($S_i$, $S_x$ and DMC catalyst) mixture of step ($\alpha$) wherein the pressure in the reactor system will increase rapidly or the alkylene oxide can be slowly added during the initial ramp-up of the alkylene oxide feed wherein the pressure in the reactor system will increase slowly. The activation of the DMC catalyst present in the starter mixture is detected when the pressure of the alkylene oxide decreases to half of the amount of the peak pressure detected in the case of the rapid addition of the alkylene oxide, or when the pressure begins to decrease and the reactor system begins to cool the reaction (indicating the presence of a reaction) in the case of slow addition of the alkylene oxide. The amount of alkylene oxide added for activation is from 1 to 12 weight percent, based on the amount of the H-functional starter substance ($S_i$) present in the starter mixture. As used herein, the amount of alkylene oxide necessary to activate the DMC catalyst present in the starter mixture of step ($\alpha$) may be referred to as the "initial" or "activation" alkylene oxide.

The low equivalent weight H-functional starter substance ($S_x$) is present to react with the activation amount of (b) an alkylene oxide which is added in step ($\beta$) to the starter mixture of step ($\alpha$) during the activation of the DMC catalyst or with (a) the alkylene oxide during the initial ramp up of the continuous addition of alkylene oxide in step ($\gamma$) before step ($\delta$) the continuous addition of the continuously added H-functional starter substance ($S_c$) is started. The reaction of the low equivalent weight H-functional starter substance ($S_x$) with the activation amount of (b) alkylene oxide which is added in step ($\beta$) prevents the polyoxyalkylene polyol used as the H-functional starter substance ($S_i$) of the starter mixture from reacting with this activation amount of alkylene oxide and increasing the polydispersity of the final polyoxyalkylene polyol product (P). The low equivalent weight H-functional starter substance ($S_x$) must be added to the starter mixture in an amount sufficient to react with the activation and/or initial alkylene oxide (i.e. before starting step ($\delta$) the continuous addition of the H-functional starter substance ($S_c$)) and limits the increase in the polydispersity and viscosity of the final polyoxyalkylene polyol (P) product due to the reaction of the activation and/or initial amount of alkylene oxide with the polyoxyalkylene polyol H-functional starter substance ($S_i$) of the starter mixture. However, addition of too much of the low equivalent weight H-functional starter substance ($S_x$) will result in no reaction or a sluggish reaction of the activation and/or initial amount of alkylene oxide, and may inhibit the DMC catalyst in a way that results in production of a low quality product (i.e. a product having a high polydispersity and a high viscosity). The skilled artisan knows and understands that the lowest equivalent weight substance preferably reacts with alkylene oxide in the presence of DMC catalyst, hence the low equivalent weight H-functional starter substance ($S_x$) will preferentially react with the activation and/or initial amount of alkylene oxide present. This is commonly known and referred to by one of ordinary skill in the art as "catch up kinetics". Catch up kinetics is described in "Chemistry and Technology of Polyols for Polyurethanes", $2^{nd}$ Edition, Volume 1, 2016, M. Ionescu, pages 189-190, the disclosure of which is herein incorporated by reference.

The process of the invention additionally comprises step ($\gamma$) continuously adding (a) an alkylene oxide to the mixture of step ($\beta$) when step ($\beta$) is present or to the mixture of step ($\alpha$) when step ($\beta$) is not present. This continuous addition comprises starting and increasing the addition of alkylene oxide in a steady manner until the final target feed rate of alkylene oxide is reached. The ramp-up of the alkylene oxide feed(s) typically takes from 5 to 35 minutes before reaching the final target feed rate(s).

Suitable alkylene oxides to be used as alkylene oxides (a) and/or (b) in accordance with the invention include, but are not limited to, compounds such as ethylene oxide, propylene oxide, 1,2- and 2,3-butylene oxide, isobutylene oxide, epichlorohydrin, cyclohexene oxide, and styrene oxide. In addition to the alkylene oxide block(s), carbon dioxide can be added in combination with the alkylene oxide(s) to form polyether carbonate polyols. The alkylene oxide(s) used as component (a) and/or (b) in the invention may be the same or different.

In accordance with the invention, the process additionally comprises ($\delta$) continuously adding a H-functional starter substance ($S_c$).

Suitable compounds to be used as the continuously added H-functional starter substance ($S_c$) include, for example, compounds which have a (nominal) hydroxyl functionality of at least about 2 up to about 8, or preferably from about 2 to about 3, and which have an equivalent weight of greater than or equal to 10 Da, or of at least 30 Da, and an equivalent weight of less than or equal to 70 Da, or preferably of less than or equal to about 50 Da. Thus, the H-functional starter substances ($S_c$) may have an equivalent weight ranging between any combination of these upper and lower values, such as, for example, of greater than or equal to 10 Da to less than or equal to 70 Da, or preferably from about 30 Da to about 50 Da. Suitable compounds to be used as the continuously added H-functional starter substance ($S_c$) herein, include compounds such as, for example, but are not limited to, ethylene glycol, propylene glycol, 1,3-propanediol, 1,4-butanediol, 1,2-butanediol, 1,3-butanediol, 2,3-butanediol, water, glycerin, sorbitol, sucrose, etc. Mixtures of monomeric initiators or their oxyalkylated oligomers may also be utilized. The continuously added H-functional starter substance ($S_c$) can be the same as or different from the low equivalent weight H-functional starter substance ($S_x$) of the starter mixture formed in step ($\alpha$).

In an embodiment of the invention, the continuously added H-functional starter substance ($S_c$) is selected from propylene glycol and/or glycerin. In one embodiment, the continuously added H-functional starter substance ($S_c$) is the same as the low equivalent weight H-functional starter substance ($S_x$) in the starter mixture.

The continuously added H-functional starter substance ($S_c$) can be acidified with a small amount of a suitable acid as described in, for example, U.S. Pat. Nos. 6,077,978 and 7,919,575. The acid may be any inorganic protic mineral acid or organic acid which is known to be suitable as described in the art. Typically, the amount of acid to be added to the continuously added H-functional starter substance ($S_c$) ranges from 30 to 250 ppm, based on the weight of the continuously added H-functional starter substance ($S_c$). In one embodiment, the continuously added H-functional starter substance ($S_c$) contains from 120 to 240 ppm of acid. Phosphoric acid is an example of a suitable acid.

In the process of the present invention, in step ($\delta$) the continuous addition of H-functional starter substance ($S_c$) is started and may be ramped simultaneously with the continuously added alkylene oxide in step ($\gamma$). The continuously added H-functional starter substance ($S_c$) is started before 4 weight percent of the total weight of alkylene oxides from step ($\gamma$) or from steps ($\beta$) and ($\gamma$) is fed, including the weight of alkylene oxide fed to activate the DMC catalyst present in the starter mixture.

In accordance with the invention, the polyoxyalkylation of the H-functional starter substances ($S_i$, $S_x$ and $S_c$) with the alkylene oxides from step ($\gamma$) and optionally from step ($\beta$) is completed to form a polyoxyalkylene polyol (P) having a functionality of from 2 to 8 and an OH number of greater than 35 to 115. The polyoxyalkylene polyols (P) formed by the process of the present invention typically have functionalities of from 2 to 8, or preferably from 2 to 6, or more preferably from 2 to 3, and OH numbers of greater than 35 to 115, or preferably from greater than 35 to 65, or more preferably greater than 35 to 56.

In the process of the present invention, (i) the steps (γ) and (δ) either start simultaneously or step (γ) starts before step (δ); (ii) the theoretical functionality of the H-functional starter substance ($S_i$) is identical to the theoretical functionality of the polyoxyalkylene polyol (P) and the measured hydroxyl number of the H-functional starter substance ($S_i$) is within 10%, or preferably within 5%, of the measured hydroxyl number of the polyoxyalkylene polyol (P); (iii) the H-functional starter substance ($S_x$) has an equivalent weight of greater than or equal to 10 Da and less than or equal to 250 Da, or preferably of greater than or equal to 20 Da and less than or equal to 70 Da, or more preferably greater than or equal to 30 Da to less than or equal to 50 Da; (iv) the H-functional starter substance ($S_c$) has an equivalent weight of greater than or equal to 10 Da and less than or equal to 70 Da; (v) in step (δ) the continuous addition of the H-functional starter substance ($S_c$) is stopped when from 30 to 90 weight percent of the total weight of alkylene oxide added in step (γ) has been added; and (vi) the hydroxyl numbers are determined according to ASTM D4274-11.

In the process of the invention, (v) in step (δ), the addition of the H-functional starter substance ($S_c$) is stopped when from 30 weight percent to 90 weight percent of the total amount of alkylene oxide added in step (γ) or in steps (β) and (γ). Preferably, the addition of the H-functional starter substance ($S_c$) is stopped when from 35 weight percent to 85 weight percent, or more preferably from 40 to 80 weight percent, of the total weight of alkylene oxide added in step (γ) or in steps (β) and (γ). Stopping the addition of the continuously added H-functional starter substance ($S_c$) in this manner results in the polyoxyalkylation being completed with only the addition of alkylene oxide. This is referred to as a "non-CAOS" cap.

In an embodiment of the present invention, the continuously added H-functional starter substance ($S_c$) in (δ) may be fed at a constant ratio with the alkylene oxide. In this embodiment, the ratio of adding the continuously added H-functional starter substance ($S_c$) to the alkylene oxide is set such that the addition of the continuously added H-functional starter substance ($S_c$) finishes prior to the alkylene oxide reaching its targeted weight. Stopping the continuously added H-functional starter substance ($S_c$) and continuing the alkylene oxide feed allows the continuously added H-functional starter substance ($S_c$) to fully react with the remaining alkylene oxide to provide a narrow molecular weight distribution in the polyoxyalkylene polyol (P) product. This eliminates any skewing of the molecular weight distribution to the lower molecular weight side.

Feeding alkylene oxide at the end of the reaction with no continuously added H-functional starter substance ($S_c$) is referred to as a "non-CAOS" cap. Feeding the continuously added H-functional starter substance ($S_c$) until 100% of the target alkylene oxide is added means that there is a 0% "non-CAOS" cap of the polyoxyalkylene polyol (P) product. The term "non-CAOS" cap is defined as the amount of alkylene oxide fed at the end of the batch with no continuously added H-functional starter substance ($S_c$), divided by the total batch weight.

The ratio of the continuously added H-functional starter substance ($S_c$) to the alkylene oxide can vary at the end of the batch in order maintain the addition of a reduced amount of continuously added H-functional starter substance ($S_c$) to the end of the batch (end of alkylene oxide feed) or until the end of the H-functional starter substance ($S_c$) ("non-CAOS" cap).

The process of using a final, reduced feed rate ratio of the continuously added H-functional starter substance ($S_c$) to alkylene oxide at the end of the batch is referred to as a "low-CAOS" cap. The "low-CAOS" cap ratio or percentage is defined as the amount of alkylene oxide fed at the final reduced feed rate ratio conditions, divided by the total batch weight. In this mode of operation, the initial feed rate ratio of the continuously added H-functional starter substance ($S_c$) to alkylene oxide is higher than the final feed rate ratio of the continuously added H-functional starter substance ($S_c$) to alkylene oxide. The change or reduction of the feed rate ratio of the continuously added H-functional starter substance ($S_c$) to alkylene oxide in the "low-CAOS" cap process occurs at a given weight percent of the total weight of alkylene oxide added in step (γ) or in steps (β) and (γ), when (β) is present, has been added. The final feed rate ratio of the continuously added H-functional starter substance ($S_c$) to alkylene oxide is less than the initial feed rate ratio of the continuously added H-functional starter substance ($S_c$) to alkylene oxide. The "low-CAOS" cap can be followed by a "non-CAOS" cap.

In accordance with the invention, in step (δ) when the continuously added H-functional starter substance ($S_c$) is added to the reaction mixture, alkylene oxide must be simultaneously added with the continuously added H-functional starter substance ($S_c$). During the addition of the continuously added H-functional starter substance ($S_c$), if, for any reason, the feed of the continuously added H-functional starter substance ($S_c$) or the alkylene oxide is interrupted and stops, the other feed must stop as well. Upon restarting after a feed interruption, these feeds must start and be ramped up simultaneously. Feeding the alkylene oxide with no continuously added H-functional starter substance ($S_c$), prior to the targeted non-CAOS cap, can significantly alter the molecular weight distribution and increase the product viscosity, even if the correct amount of continuously added H-functional starter substance ($S_c$) is added later in the batch (so the correct hydroxyl number or equivalent weight is attained). Feeding the continuously added H-functional starter substance ($S_c$) with no alkylene oxide can cause DMC catalyst reactivity issues when the alkylene oxide feed is restarted, including DMC catalyst deactivation and/or temperature excursions leading to undesirable changes to the molecular weight distribution and viscosity.

In accordance with the present invention, the process is typically carried out in a stainless steel reaction vessel (e.g. 35 Liter or larger) equipped with an electrically heated jacket and an internal coil that can be used for heating or cooling the reaction mixture. Steam, water or a combination of the two can be passed through cooling coil to control the reaction temperature. Tempered water or a hot oil system can also be used to control the temperature. The reactor system includes a mechanical agitator that can be equipped with a single agitating device such as a gate-type mixer or an anchor type mixer or other such devices known to those skilled in the art. The agitator could also be equipped with one or multiple mixers such as pitched blade impeller, Rushton-type impeller, flat blade, curved blade, tilted blade or other such devices known to those skilled in the art. The blades can be used individually or in combination. The agitator speed can be constant or varied during the batch. The reactor internals may include baffles. The reactor can also be equipped with a recirculation pump loop that withdraws the reaction mixture from the bottom portion of the reactor and pumps the reaction mixture back into the reactor through a dip tube or spray nozzle in the upper part of the reactor or through a dip tube or sparge ring at the bottom part of the reactor. The recirculation loop can include a heat exchanger for temperature control or can include a static mixing device. The reactor and associated metering and monitoring equipment are connected to a digital process control system.

The reactor system includes an alkylene oxide dosing system for one or more alkylene oxide feeds (e.g. propylene and/or ethylene oxide). When more than one alkylene oxide is used, the alkylene oxides can be introduced to the reactor together or separately. They can be mixed and fed in together, or they can be stored separately and mixed using a static mixing device before being introduced to the reactor. The alkylene oxides can be introduced into the headspace of the reactor through a dip tube or spray nozzle or into the liquid phase in the reactor through a dip tube or sparge ring. The mixing impellers can be optimized to match the location of alkylene oxide addition to provide a high shear/mixing zone near the alkylene oxide injection location. The alkylene oxides can also be introduced to the recirculation line directly or via a static mixing device. The alkylene oxide feeds can be dosed over a range of 0.25 hours to 20 hours depending on the reactor configuration (mixing) and heat removal capabilities.

The reactor system includes a dosing system for the continuously added H-functional starter substance ($S_c$). When more than one continuously added H-functional starter substances ($S_c$) are used, these can be introduced to the reactor together or separately. They can be mixed and fed in together, or they can be stored separately and mixed using a static mixing device before being introduced to the reactor. The continuously added H-functional starter substances ($S_c$) can be introduced into the headspace of the reactor through a dip tube or spray nozzle or into the liquid phase in the reactor through a dip tube or sparge ring. The mixing impellers can be optimized to match the location of continuously added H-functional starter substances ($S_c$) addition point to provide a high shear/mixing zone near the continuously added H-functional starter substance ($S_c$) injection location. The continuously added H-functional starter substance ($S_c$) can also be introduced to the recirculation line directly or via a static mixing device. The continuously added H-functional starter substance ($S_c$) can also be premixed with the alkylene oxide and introduced to the reactor directly via a dip tube or sparge ring or via a static mixing device.

The finished polyoxyalkylene polyol product (P) of the present invention containing residual DMC catalysts can be vacuum stripped with or without steam and/or nitrogen to remove any residual compounds introduced from the reaction or the raw materials. The finished polyoxyalkylene polyol product (P) is also typically inhibited with antioxidants known to the skilled artisan. Examples of suitable antioxidants for polyether polyols include sterically hindered phenolic compounds such as BHT (i.e. butylated hydroxytoluene), octadecyl 3-(3,5-di-tert-butyl-4-hydroxyphenyl) propionate (i.e. Irganox 1076), 3,4-dihydro-2,5,7,8-tetramethyl-2-(4,8,12-trimethyltridecyl)-2H-1-benzopyran-6-ol (i.e. Irganox E-201), or other equivalent antioxidants or inhibitors. The finished polyoxyalkylene polyol product (P) may also be acidified with any inorganic protic mineral acid or organic acid which is known to be suitable as described in the art. The finished polyoxyalkylene polyol product (P) is preferably inhibited with an antioxidant prior to stripping with or without steam and/or nitrogen. Additional inhibitor can be added after the stripping, with or without steam and/or nitrogen, and any acid addition, if required, is preferably added after the stripping, with or without steam and/or nitrogen. The final inhibitor and/or acid can be added directly to the stripping vessel, or to the storage vessel, or can be continuously added to the product in the transfer line between the stripping vessel and the storage vessel. Alternatively, the polyoxyalkylene polyol product (P) can be stored with only antioxidant and any required acid can be added to the storage vessel prior to shipment or to the shipping container, either directly to the container or added continuously to the transfer line between the storage vessel and the shipping container or prior to the final product use.

In a first embodiment, the invention is directed to a process for the preparation of polyoxyalkylene polyols (P) having a functionality of 2 to 8 and an hydroxyl number of greater than 35 mg KOH/g polyol to 115 mg KOH/g polyol by reaction of H-functional starter substances ($S_i$), ($S_c$) and ($S_x$) with one or more alkylene oxide(s) in the presence of a double metal cyanide catalyst (DMC), in which the process comprises the steps (α) forming a starter mixture comprising the H-functional starter substance ($S_i$), the H-functional starter substance ($S_x$) and the double metal cyanide catalyst, and optionally, stripping the starter mixture under vacuum with or without nitrogen; (γ) continuously adding (a) an alkylene oxide to the starter mixture of step (α); and (δ) continuously adding the H-functional starter substance ($S_c$); wherein (i) the steps (γ) and (δ) either start simultaneously or step (γ) starts before step (δ); (ii) the theoretical functionality of the H-functional starter substance ($S_i$) is identical to the theoretical functionality of the polyoxyalkylene polyol (P) and the measured hydroxyl number of the H-functional starter substance ($S_i$) is within 10% of the measured hydroxyl number of the polyoxyalkylene polyol (P); (iii) the H-functional starter substance ($S_x$) has an equivalent weight of greater than or equal to 10 Da and less than or equal to 250 Da; (iv) the H-functional starter substance ($S_c$) has an equivalent weight of greater than or equal to 10 Da and less than or equal to 70 Da; (v) in step (δ) the continuous addition of the H-functional starter substance ($S_c$) is stopped when 30 weight percent to 90 weight percent of the total weight of alkylene oxide added in step (γ) has been added; and (vi) the hydroxyl numbers are determined according to ASTM D4274-11.

In a second embodiment, the invention is directed to the process according to the first embodiment, additionally comprising (β) adding an activation amount of (b) an alkylene oxide to the starter mixture of step (α), wherein in step (γ) the continuous addition of (a) alkylene oxide is to the mixture formed in (β); and (v) in step (δ) the continuous addition of the H-functional starter substance ($S_c$) is stopped when from 30 to 90 weight percent of the total weight of alkylene oxide added in steps (β) and (γ) has been added.

In a third embodiment, the invention is directed to the process according to the first or second embodiments wherein (ii) the theoretical functionality of the H-functional starter substance ($S_i$) is identical to the theoretical functionality of the polyoxyalkylene polyol (P) and the measured hydroxyl number of the H-functional starter substance ($S_i$) is within 5% of the measured hydroxyl number of the polyoxyalkylene polyol (P).

In a fourth embodiment, the invention is directed to the process according to the first or third embodiments wherein (v) in step (δ) the continuous addition of the H-functional starter substance ($S_c$) is stopped when from 35 weight percent to 85 weight percent, preferably from 40 weight percent to 80 weight percent, of the total weight of alkylene oxide added in step (γ) is added.

In a fifth embodiment, the invention is directed to the process according to the second or third embodiments wherein (v) in step (δ) the continuous addition of the H-functional starter substance ($S_c$) is stopped when from 35 weight percent to 85 weight percent, preferably when from 40 weight percent to 80 weight percent, of the total weight of alkylene oxide added in steps (β) and (γ) is added.

In a sixth embodiment, the invention is directed to the process according to one of the first to the fifth embodiments wherein the H-functional starter substance ($S_i$) has a functionality of about 2 to about 8 and an OH number of greater than 35 to 115, preferably a functionality of from 2 to 6 and an OH number of greater than 35 to 65, more preferably a functionality of 2 to 3 and an OH number of greater than 35 to 56.

In a seventh embodiment, the invention is directed to the process according to one of the first to the sixth embodiments in which the H-functional starter substance ($S_i$) comprises a polyoxyalkylene polyol containing double metal cyanide catalyst residuals.

In an eighth embodiment, the invention is directed to the process according to one of the first to the seventh embodiments in which the H-functional starter substance ($S_i$) comprises a polyoxyalkylene polyol containing double metal cyanide catalyst residuals wherein the double metal cyanide catalyst residuals were previously exposed to alkylene oxide.

In a ninth embodiment, the invention is directed to the process according to one of the first to the eighth embodiments in which the H-functional starter substance ($S_i$) comprises a polyoxyalkylene polyol containing double metal cyanide catalyst residuals wherein the double metal cyanide catalyst residuals comprise a pre-activated catalyst which was previously exposed to alkylene oxide under reaction conditions.

In a tenth embodiment, the invention is directed to the process according to one of the first to the ninth embodiments in which the H-functional starter substance ($S_i$) comprises a polyoxyalkylene polyol which comprises an antioxidant and/or an acid.

In an eleventh embodiment, the invention is directed to the process according to one of the first to the tenth embodiments wherein the H-functional starter substance ($S_x$) has an equivalent weight of about 20 Da to about 70 Da, more preferably of 30 Da to 50 Da.

In an twelfth embodiment, the invention is directed to the process according to one of the first to the eleventh embodiments wherein said H-functional starter substance ($S_x$) comprises ethylene glycol, propylene glycol, butylene glycol, glycerin, water, trimethylolpropane, sorbitol, sucrose, or combinations thereof.

In a thirteenth embodiment, the invention is directed to the process according to one of the first to the twelfth embodiments in which the H-functional starter substance ($S_c$) has an equivalent weight of about 30 Da to about 50 Da.

In a fourteenth embodiment, the invention is directed to the process according to one of the first to the thirteenth embodiments in which (a) the alkylene oxide which is continuously added in (γ) comprises propylene oxide, ethylene oxide, or combinations thereof.

In a fifteenth embodiment, the invention is directed to the process according to one of the second to the fourteenth embodiments in which (b) the alkylene oxide which is added in (β) comprises propylene oxide, ethylene oxide, or combinations thereof.

In a sixteenth embodiment, the invention is directed to the process according to one of the first to the fifteenth embodiments in which the H-functional starter substance ($S_x$) is present in an amount of from 0.1 to 2.0 weight percent, or preferably from 0.25 to 1.75 weight percent, or more preferably from 0.5 to 1.5 weight percent, based on the weight of said H-functional starter substance ($S_i$) present in the starter mixture of step (α).

In a seventeenth embodiment, the invention is directed to the process according to one of the first to the sixteenth embodiments wherein said H-functional starter substance ($S_x$) and said H-functional starter substance ($S_c$) are the same substance.

In an eighteenth embodiment, the invention is directed to the process according to one of the first to the seventeenth embodiments wherein the H-functional starter substance ($S_c$) comprises ethylene glycol, propylene glycol, butylene glycol, glycerin, water, trimethylolpropane, sorbitol, sucrose, or combinations thereof.

In a nineteenth embodiment, the invention is directed to the process according to one of the first to the eighteenth embodiments wherein the H-functional starter substance ($S_c$) additionally comprises at least one acid.

In a twentieth embodiment, the invention is directed to the process according to one of the first to the nineteenth embodiments wherein the resultant polyoxyalkylene polyol (P) has a functionality of from 2 to 6 and a hydroxyl number of greater than 35 to 65, preferably a functionality of from 2 to 3 and an OH number of greater than 35 to 56.

In a twenty-first embodiment, the invention is directed to the process according to one of the first to the twentieth embodiments, wherein the amount of alkylene oxide added in step (γ) to activate the catalyst is from 1 to 12 weight percent of the H-functional starter substance ($S_i$) present in the starter mixture of step (α).

In a twenty-second embodiment, the invention is directed to the process according to the second to the twentieth embodiments wherein the amount of alkylene oxide added in step (β) to activate the catalyst is from 1 to 12 weight percent of the H-functional starter substance ($S_i$) present in the starter mixture of step (α).

In a twenty-third embodiment, the invention is directed to the process according to one of the first to the twenty-second embodiments, wherein step (δ) continuously adding said H-functional starter substance ($S_c$) starts before 4 weight percent of the total weight of alkylene oxide added from step (γ) is fed.

In a twenty-fourth embodiment, the invention is directed to the process according to one of the second to the twenty-third embodiments, wherein step (δ) continuously adding said H-functional starter substance ($S_c$) starts before 4 weight percent of the total weight of alkylene oxide added from steps (β) and (γ) is fed.

In a twenty-fifth embodiment, the invention is directed to the process according to one of the first to the twenty-fourth embodiments wherein the resultant polyoxyalkylene polyol (P) additionally comprises an antioxidant and/or an acid.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

Examples

In the examples, the OH (hydroxyl numbers) were determined in accordance with ASTM D-4274-11, as described above, and are reported in mg [KOH]/g polyol.

Viscosity was determined in accordance with ASTM-D4878-15 as described above.

Gel Permeation Chromatography (GPC) was used to determine the molecular weights (weight average and number average) in accordance with DIN 55672-1 as described hereinabove. All molecular weights are number average unless specified otherwise.

The examples herein were carried out in a 35 Liter stainless steel reaction vessel equipped with an electrically heated jacket and an internal coil that can be used for cooling the reaction mixture using water. The reactor was equipped with baffles and an agitator that contains a Ruston type agitator at the bottom and pitched blade in the upper portion. The alkylene oxide and continuously added H-functional starter substance ($S_c$) feeds were introduced into the liquid phase using dip pipes.

The following compounds or materials were used in the examples.

Catalyst A: A double metal cyanide catalyst prepared according to the procedure in U.S. Pat. No. 5,482,908.

Irganox E-201: a primary (phenolic) antioxidant, which contains Vitamin E, and is commercially available from BASF

Comparative Example 1

Figure 1:
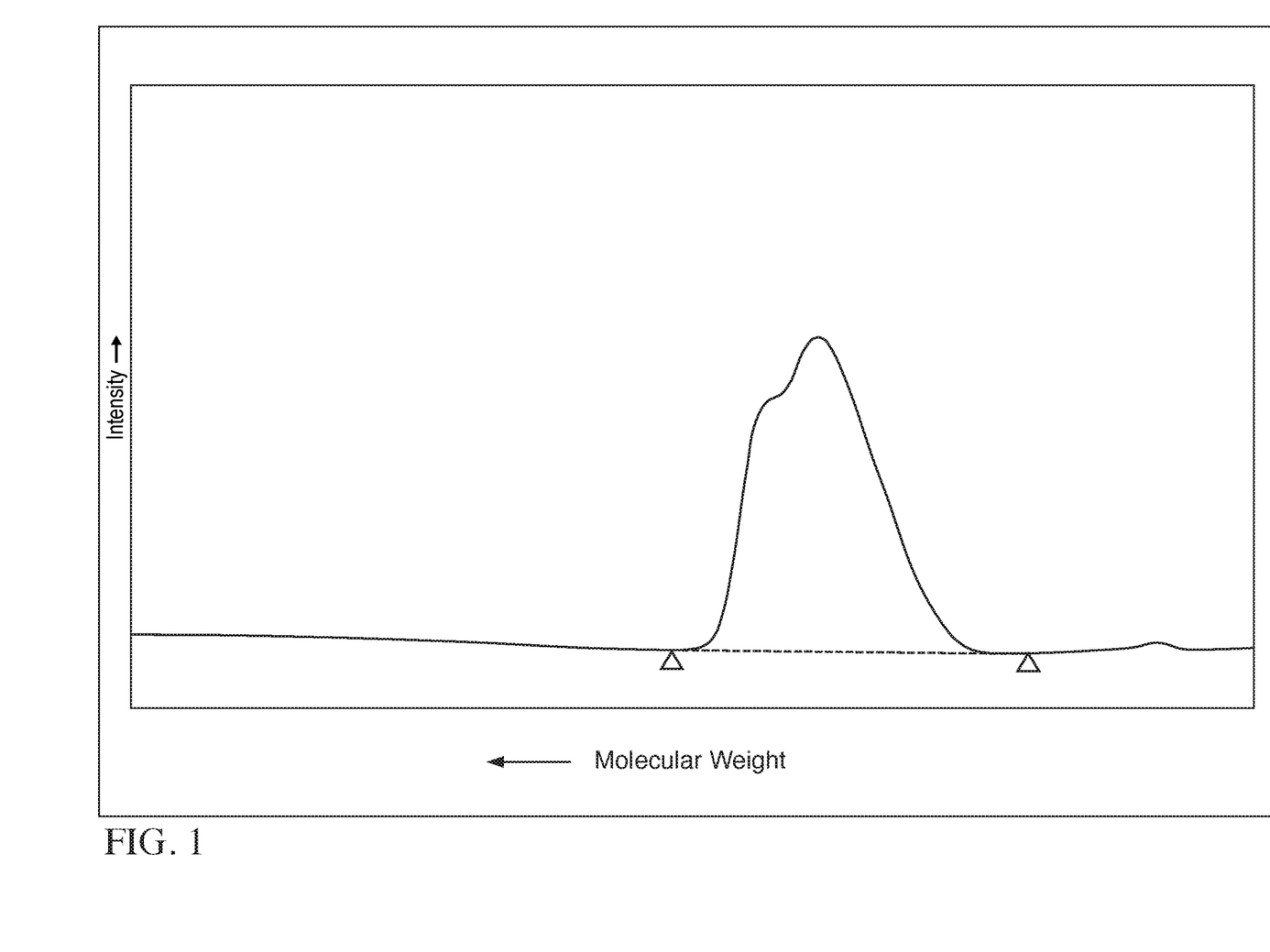
FIG. 1 is a GPC illustrating the molecular weight distribution of a product prepared by a prior art process with no pre-CAOS charge and a 5 weight percent non-CAOS cap.

To the 35 L reactor described above, 2500 grams of a 2000 MW diol ($S_i$) made via semi-batch process using Catalyst A and 0.6 grams of Catalyst A were charged. This mixture was heated to 130° C. Vacuum was applied to a level of 0.1 psia and nitrogen was introduced via a dip tube or to the liquid phase for 30 minutes. Propylene oxide (100 g) was charged to activate the catalyst. The pressure increased to 15 psia and then steadily decreased indicating the catalyst was active. When the pressure reached 3 psia, the PO feed was restarted and ramped to 72.8 g/min over 20 minutes. Simultaneously, propylene glycol, as the continuously added starter ($S_c$), was started and ramped to a feed rate of 3.07 g/min. The PG, as $S_c$, started after 100 g of PO was fed or 0.6 wt % of the total PO to be fed (100 g/16836 g). The PG was fed at a constant ratio of 4.2 wt. % based on the PO feed rate (3.07 g/min PG/72.8 g/min PO). The PG and PO feeds continued until the PG feed met the target weight of 664 grams. At the targeted PG/PO ratio of 4.2% the target was reached after 15836 grams of PO was fed or 94% of the total PO. The remaining 1000 grams of PO continued at the feed rate of 72.8 g/min until the final PO target of 16836 was reached. The feeding of 1000 grams of PO without the PG feed corresponds to a "non-CAOS" cap of 5% based on the total batch weight (1000 g/20000 g batch). The final product (P) was inhibited with 160 ppm Irganox E-201. The final product (P) had a hydroxyl number of 57.1 mg KOH/g and a viscosity of 363 cSt (hydroxyl number adjusted viscosity is 370 cSt, adjusting to a hydroxyl number of 56.1 mg KOH/g polyol) and a polydispersity index (Mw/Mn) of 1.104. This comparative example was made with no "pre-CAOS" charge (no $S_x$) to the starter mixture and was made with a 5 weight percent "non-CAOS" cap. FIG. 1 demonstrates the broad molecular weight distribution of the product (P) prepared using this Product-to-Product process. The $2^{nd}$ peak or shoulder at the higher molecular weight side of the GPC is a result of the polyoxyalkylene polyol (P) which was used as the H-functional starter substance ($S_i$) of the starter mixture reacting with the activation alkylene oxide as no PG or low equivalent weight H-functional starter substance ($S_x$) was present in the starter mixture. The poor (i.e. broad) molecular weight distribution is also demonstrated in the higher viscosity.

Comparative Example 2

Figure 2:
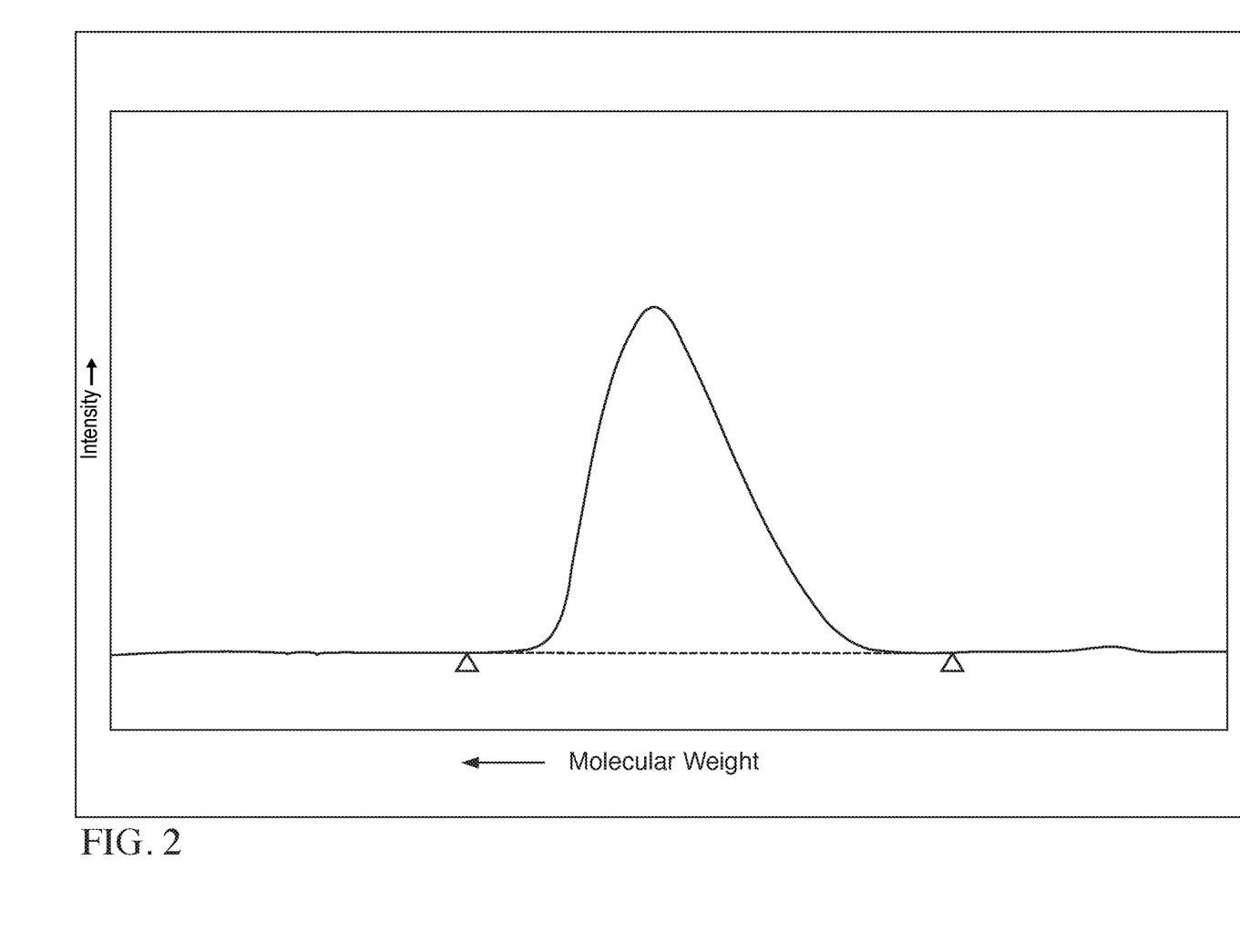
FIG. 2 is a GPC illustrating the molecular weight distribution of a product prepared by a prior art process with a pre-CAOS charge and a 5 weight percent non-CAOS cap.

To the 35 L reactor described above, 2500 grams of a 2000 MW diol ($S_i$) made via a semi-batch process using Catalyst A and 0.6 grams of Catalyst A were charged. This mixture was heated to 1301. Vacuum was applied to a level of 0.1 psia and nitrogen was introduced via a dip tube or to the liquid phase for 30 minutes. After the nitrogen was stopped, 12.5 grams of propylene glycol ($S_x$) (0.5 wt. % PG based on the weight of the polyoxyalkylene polyol component ($S_i$) of the starter mixture) were charged to the starter mixture. The 12.5 grams of PG represents a 0.5 wt. % "pre-CAOS" charge (12.5 g PG/2500 g $S_i$). Propylene oxide (100 g) was charged to activate the catalyst. The pressure increased to 12 psia and then steadily decreased, indicating the catalyst was active. When the pressure reached 5 psia, the PO feed was restarted and ramped to 72.8 g/min over 20 minutes. Simultaneously, propylene glycol, as the continuously added starter ($S_c$), was started and ramped to a feed rate of 3.02 g/min. The PG, as $S_c$, started after 100 g of PO was fed or 0.6 wt % of the total PO to be fed (100 g/16836 g). The PG was fed at a constant ratio of 4.1 wt. % based on the PO feed rate (3.02 g/min PG/72.8 g/min PO). The PG and PO feeds continued until the PG feed met the target weight of 652 grams. At the targeted PG/PO ratio of 4.1 wt. %, the target was reached after 15836 grams of PO was fed or 94% of the total PO. The remaining 1000 grams of PO continued at the feed rate of 72.8 g/min until the final PO target of 16836 was reached. The feeding of 1000 grams of PO without the PG feed corresponds to a "non-CAOS" cap of 5 wt. % based on the total batch weight (1000 g/20000 g batch). The final product (P) was inhibited with 160 ppm Irganox E-201. The final product (P) had a hydroxyl number of 56.6 mg KOH/g polyol and a viscosity of 354 cst (hydroxyl number adjusted viscosity is 358 cSt, adjusting to a hydroxyl number of 56.1 mg KOH/g polyol) and a polydispersity index (Mw/Mn) of 1.092. This comparative example was made with a "pre-CAOS" charge ($S_x$) to the polyoxyalkylene polyether H-functional starter substance ($S_i$) of the starter mixture and a 5 weight percent "non-CAOS" cap. FIG. 2 demonstrates that in this example, the high molecular weight shoulder was minimized by adding the PG or "pre-CAOS" charge ($S_x$) to the polyoxyalkylene polyether substance ($S_i$) of the starter mixture prior to activation of the DMC catalyst with PO. The 5 weight percent "non-CAOS" cap of Examples 1 and 2 illustrates a broadening of the polydispersity at the lower molecular weight side at this molecular weight (i.e. 2000 MW). The viscosity of the product was also affected by the broader/non-symmetrical MW distribution.

Example 3

Figure 3:
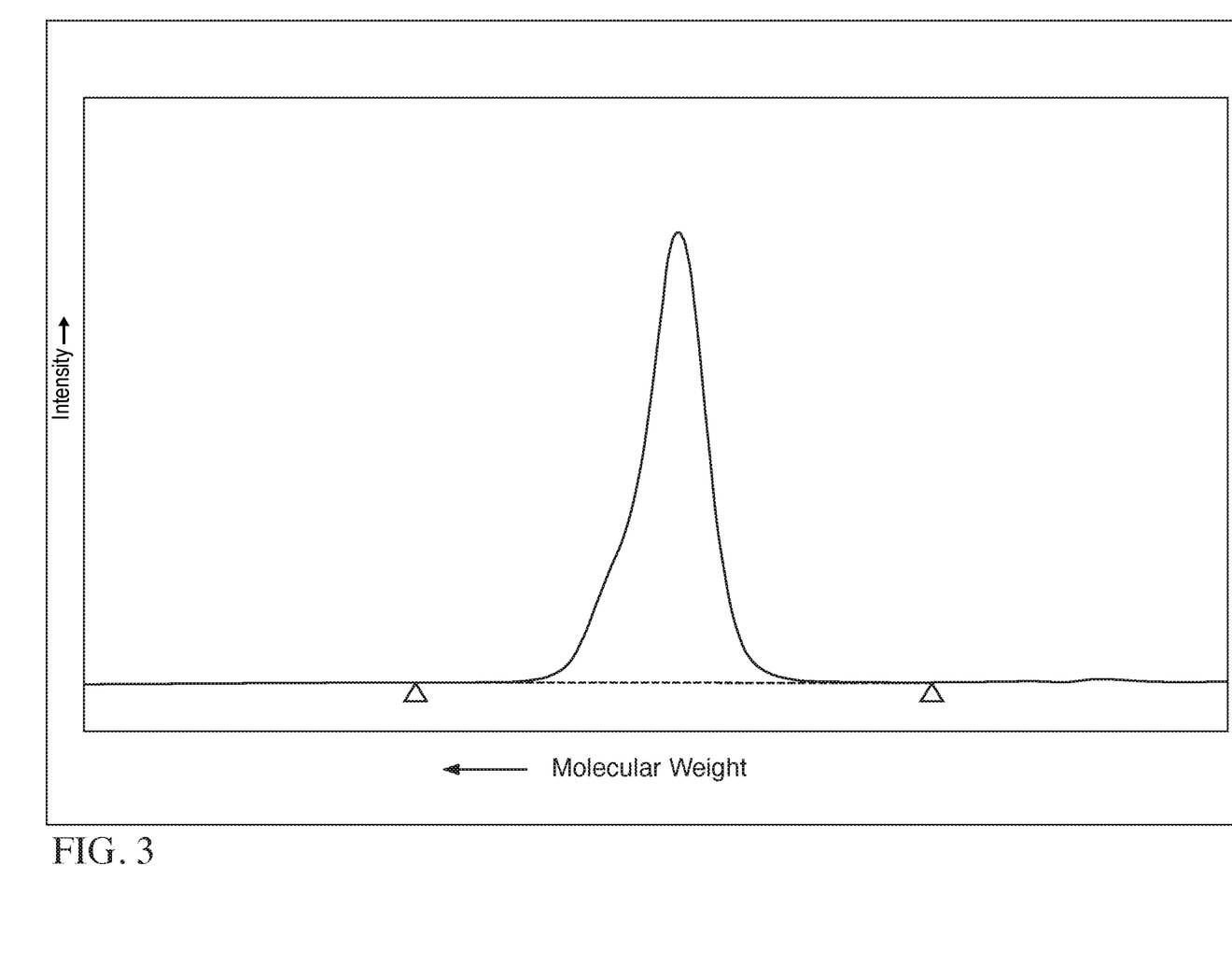
FIG. 3 is a GPC illustrating the molecular weight distribution of a product prepared in accordance with the present invention with a pre-CAOS charge and a 50 weight percent non-CAOS cap.

Using the same reactor and reaction conditions as Example 2, 2500 grams of a 2000 MW diol ($S_i$), 0.6 grams of Catalyst A and 12.5 grams of PG (0.5 wt. % "pre-CAOS", 12.5 g PG/2500 g $S_i$) ($S_x$) were charged. PO was charged at 100 grams to activate the catalyst. The PO and PG ($S_c$) were ramped up simultaneously to 72.8 g/min for the PO and 7.04 g/min for PG (PG/PO ratio of 9.7 wt. %). The PG, as $S_c$, started after 100 g of PO was fed or 0.6 wt % of the total PO to be fed (100 g/16836 g). The PG and PO feeds continued until the PG feed met the target weight of 652 grams. At the targeted PG/PO ratio of 9.7 wt. % the target was reached after 6836 grams of PO was fed or 40% of the total PO. The remaining 10000 grams of PO continued at the feed rate of 72.8 g/min until the final PO target of 16836 was reached. The feeding of 10000 grams of PO without the PG feed corresponds to a "non-CAOS" cap of 50 wt. % based on the total batch weight (10000 g/20000 g batch). The final product (P) was inhibited with 160 ppm Irganox E-201. The final product (P) had a hydroxyl number of 55.7 mg KOH/g polyol, a viscosity of 340 cSt (adjusted viscosity of 338 cSt, adjusting to a hydroxyl number of 56.1 mg KOH/g polyol) and a polydispersity index (Mw/Mn) of 1.035. The product (P) was made with a pre-CAOS charge ($S_x$) and a 50 weight percent non-CAOS cap. FIG. 3 illustrates the molecular weight distribution for this product. The product viscosity was good and the molecular weight distribution was narrow using the pre-CAOS charge ($S_x$) and a 50 weight percent non-CAOS cap for this molecular weight. The use of the pre-CAOS charge ($S_x$) prevents the polyoxyalkylene polyether substance ($S_i$) of the starter mixture from reacting with the activation alkylene oxide as the low equivalent weight substance ($S_x$) reacts preferentially with the alkylene oxide when using a DMC catalyst. The 50 weight percent non-CAOS cap provides the continuously added starter ($S_c$) with sufficient alkylene oxide to fully react to the target equivalent weight.

Examples 4, 5 and 6

Using the same reactor and reaction conditions as Example 3, three consecutive batches of 2000 MW diol were made. The first batch (Example 4) used the same conditions as Example 3 (i.e. same $S_i$, 0.5 weight percent "pre-CAOS" ($S_x$) and 50 weight percent "non-CAOS" cap). Example 5 used the product (P) from Example 4 as the polyoxyalkylene polyether substance ($S_i$) of the starter mixture and then used the same conditions as Example 3 (i.e. 0.5 weight percent "pre-CAOS" ($S_x$) and 50 weight percent "non-CAOS" cap). Example 6 used the product (P) from Example 5 as the polyoxyalkylene polyether substance ($S_i$) of the starter mixture and the same conditions as Example 3 (i.e. 0.5 weight percent "pre-CAOS" ($S_x$) and 50 weight percent "non-CAOS" cap). The conditions and results are shown in Table 1. The results demonstrate the ability to make consecutive batches using the inventive product-to-product approach.

The products (P) in Examples 4, 5 and 6 were prepared with a 0.5 weight percent pre-CAOS charge ($S_x$) and a 50 weight percent non-CAOS cap. Each of these products has a good, low viscosity and a narrow molecular weight distribution.

TABLE 1

|  | Comp. Ex. 1 | Comp. Ex. 2 | Ex. 3 | Ex. 4 | Ex. 5 | Ex. 6 |
|---|---|---|---|---|---|---|
| Pre-CAOS, wt. % of Addition of ($S_x$) in step α | 0 | 0.5 | 0.5 | 0.5 | 0.5 | 0.5 |
| Non-CAOS Cap, wt. % | 5 | 5 | 50 | 50 | 50 | 50 |
| Wt. % of Oxide of Total Feed at Non-CAOS Cap, wt. % | 94 | 94 | 40 | 40 | 40 | 40 |
| $S_c$ wt./Oxide wt. Ratio, % | 4.2 | 4.1 | 9.7 | 9.7 | 9.7 | 9.7 |
| Hydroxyl Number[1] (mg KOH/g polyol) | 57.1 | 56.6 | 55.7 | 55.5 | 55.6 | 55.4 |
| Viscosity[2] (cSt @ 25° C.) | 363 | 354 | 340 | 341 | 341 | 340 |
| OH# Adjusted Viscosity (cSt @ 25° C.)[3] | 370 | 358 | 338 | 338 | 338 | 336 |
| Polydispersity (Mw/Mn)[4] | 1.104 | 1.092 | 1.035 | 1.032 | 1.032 | 1.032 |

[1]measured in accordance with ASTM-D4274-11
[2]measured in accordance with ASTM D-4878-15
[3]adjusted to target value (56.1 mg KOH/g) by using measured OH# and measured viscosity and linearly increasing viscosity when the measured OH# is greater than target (MW or EQ is less than target so MW or EQ must increase to reach target therefore viscosity increases) and linearly decreasing viscosity when the measured OH# is less than target (MW or EQ is greater than target so MW or EQ must decrease to reach target therefore viscosity decreases)
[4]measured in accordance with DIN 5567201

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a polyoxyalkylene polyol (P) having a functionality of 2 to 8 and a hydroxyl number of greater than 35 mg KOH/g to 115 mg KOH/g by reaction of H-functional starter substances ($S_i$), ($S_c$) and ($S_x$) with one or more alkylene oxide(s) in the presence of a double metal cyanide catalyst (DMC), comprising
   (α) forming a starter mixture comprising said H-functional starter substances ($S_i$) and ($S_x$), and said double metal cyanide catalyst, and optionally, stripping the starter mixture under vacuum;
   (γ) continuously adding (a) an alkylene oxide to the starter mixture of step (α); and
   (δ) continuously adding said H-functional starter substance ($S_c$);
   wherein
   (i) steps (γ) and (δ) either start simultaneously or step (γ) starts before step (δ);
   (ii) the theoretical functionality of said H-functional starter substance ($S_i$) is identical to the theoretical functionality of said polyoxyalkylene polyol (P) and the measured hydroxyl number of said H-functional starter substance ($S_i$) is within 10% of the measured hydroxyl number of said polyoxyalkylene polyol (P);
   (iii) said H-functional starter substance ($S_x$) has an equivalent weight greater than or equal to 10 Da and less than or equal to 250 Da;
   (iv) said H-functional starter substance ($S_c$) has an equivalent weight of greater than or equal to 10 Da and less than or equal to 70 Da;
   (v) in step (δ) the continuous addition of said H-functional starter substance ($S_c$) is stopped when from 30 weight percent to 90 weight percent of the total weight of alkylene oxide added in step (γ) has been added; and
   (vi) said hydroxyl numbers are determined according to ASTM D4274-11.

2. The process according to claim 1, additionally comprising:
   (β) adding an activation amount of (b) an alkylene oxide to the starter mixture of step (α);
   wherein in step (γ) the alkylene oxide (a) is continuously added to the mixture formed in (β); and (v) in step (δ)

the continuous addition of said H-functional starter substance ($S_c$) is stopped when from 30 weight percent to 90 weight percent of the total weight of alkylene oxide added in steps (β) and (γ) has been added.

3. The process according to claim 1, wherein the measured hydroxyl number of said H-functional starter substance ($S_i$) is within 5% of the measured hydroxyl number of the polyoxyalkylene polyol (P).

4. The process according to claim 1, wherein (v) in step (δ) the continuous addition of said H-functional starter substance ($S_c$) is stopped when from 35 weight percent to 85 weight percent of the total weight of alkylene oxide added in step (γ) is added.

5. The process according to claim 2, wherein (v) in step (δ) the continuous addition of said H-functional starter substance ($S_c$) is stopped when from 35 weight percent to 85 weight percent of the total weight of alkylene oxide added in steps (β) and (γ) is added.

6. The process according to claim 1, wherein said H-functional starter substance ($S_i$) has a functionality of about 2 to about 8, and an OH number of greater than 35 to about 115.

7. The process according to claim 1, wherein said H-functional starter substance ($S_i$) comprises a polyoxyalkylene polyol containing double metal cyanide catalyst residuals.

8. The process according to claim 7, wherein double metal cyanide catalyst residuals were previously exposed to alkylene oxide.

9. The process according to claim 7, wherein the double metal cyanide catalyst residuals comprise a pre-activated catalyst which was previously exposed to alkylene oxide under reaction conditions.

10. The process according to claim 1, wherein said H-functional starter substance ($S_i$) comprises a polyoxyalkylene polyol which comprises an antioxidant and/or an acid.

11. The process according to claim 1, wherein said H-functional starter substance ($S_x$) has an equivalent weight of about 20 Da to about 70 Da.

12. The process according to claim 1, wherein said H-functional starter substance ($S_x$) comprises ethylene glycol, propylene glycol, butylene glycol, glycerin, water, trimethylolpropane, sorbitol, sucrose, or combinations thereof.

13. The process according to claim 1, wherein said H-functional starter substance ($S_c$) has an equivalent weight of about 30 Da to about 50 Da.

14. The process according to claim 1, wherein (a) said alkylene oxide which is continuously added in (γ) comprises propylene oxide, ethylene oxide, or combinations thereof.

15. The process according to claim 2, wherein (b) said alkylene oxide which is added in (β) comprises propylene oxide, ethylene oxide, or combinations thereof.

16. The process according to claim 1, wherein said H-functional starter substance ($S_x$) is present in an amount of from 0.1 to 2.0 weight percent, based on the weight of said H-functional starter substance ($S_i$) present in said starter mixture of step (α).

17. The process according to claim 1, wherein said H-functional starter substance ($S_x$) and said H-functional starter substance ($S_c$) are the same substance.

18. The process according to claim 1, wherein said H-functional starter substance ($S_c$) comprises ethylene glycol, propylene glycol, butylene glycol, glycerin, water, trimethylolpropane, sorbitol, sucrose, or combinations thereof.

19. The process according to claim 1, wherein said H-functional starter substance ($S_c$) additionally comprises at least one acid.

20. The process according to claim 1, wherein the polyoxyalkylene polyols (P) formed have a functionality of from 2 to 6 and a hydroxyl number of greater than 35 to 65.

21. The process according to claim 1, wherein the amount of (a) alkylene oxide added in step (γ) to activate the catalyst is from 1 to 12 weight percent of the H-functional starter substance ($S_i$) present in the starter mixture of step (α).

22. The process according to claim 2, wherein the amount of (b) alkylene oxide added in step (β) to activate the catalyst is from 1 to 12 weight percent of the H-functional starter substance ($S_i$) present in the starter mixture of step (α).

23. The process according to claim 1, wherein (δ) continuously adding the H-functional starter substance ($S_c$) starts before 4 weight percent of the total weight of alkylene oxide added from step (γ) is fed.

24. The process according to claim 2, wherein (δ) continuously adding the H-functional starter substance ($S_c$) starts before 4 weight percent of the total weight of alkylene oxide added from steps (β) and (γ) is fed.

25. The process according to claim 1, wherein the resultant polyoxyalkylene polyol (P) additionally comprises an antioxidant and/or an acid.

\* \* \* \* \*